(12) United States Patent
Turner et al.

(10) Patent No.: US 8,819,653 B2
(45) Date of Patent: Aug. 26, 2014

(54) AUTOMATED IMPROVEMENT OF EXECUTABLE APPLICATIONS BASED ON EVALUATING INDEPENDENT EXECUTION HEURISTICS

(75) Inventors: Bryan Turner, Durham, NC (US); Billy Gayle Moon, Apex, NC (US)

(73) Assignee: Cisco Technology, Inc., San Jose, CA (US)

( * ) Notice: Subject to any disclaimer, the term of this patent is extended or adjusted under 35 U.S.C. 154(b) by 272 days.

(21) Appl. No.: 13/361,787

(22) Filed: Jan. 30, 2012

(65) Prior Publication Data

US 2013/0198729 A1   Aug. 1, 2013

(51) Int. Cl.
*G06F 9/45* (2006.01)
(52) U.S. Cl.
USPC ............ 717/151; 717/140; 717/146; 717/153
(58) Field of Classification Search
CPC . G06F 8/443; G06F 9/45516; G06F 9/45525; G06F 11/3447; G06F 8/314; G06F 17/3053; G06F 17/271; G06F 17/2785
See application file for complete search history.

(56) References Cited

U.S. PATENT DOCUMENTS

| | | | | |
|---|---|---|---|---|
| 5,966,537 | A * | 10/1999 | Ravichandran | 717/158 |
| 8,117,288 | B2 * | 2/2012 | Bhanot et al. | 709/220 |
| 8,136,101 | B2 * | 3/2012 | Prakash | 717/140 |
| 2004/0117779 | A1 * | 6/2004 | Lagergren | 717/153 |
| 2005/0044538 | A1 * | 2/2005 | Mantripragada | 717/151 |
| 2005/0246699 | A1 * | 11/2005 | Lagergren | 717/153 |
| 2006/0005177 | A1 * | 1/2006 | Atkin et al. | 717/151 |
| 2008/0307399 | A1 * | 12/2008 | Zhou et al. | 717/141 |
| 2009/0320003 | A1 * | 12/2009 | Barsness et al. | 717/146 |
| 2013/0198729 | A1 * | 8/2013 | Turner et al. | 717/151 |
| 2013/0205286 | A1 * | 8/2013 | Barraclough et al. | 717/151 |

OTHER PUBLICATIONS

Tim A. Wagner et al.; Accurate Static Estimators for Program Optimization; 1994 ACM; pp. 85-96; <http://dl.acm.org/citation.cfm?id=178251>.*
Kenneth Hoste et al.; COLE Compiler Optimization Level Exploration; 2008 ACM; pp. 165-174; <http://dl.acm.org/citation.cfm?id=1356080>.*
Jasjeet S. Sekhon; Multivariate and Propensity Score Matching Software with Automated Balance Optimization the Matching package for R; 2011 Journal of statisical Software; 47 pages; <http://psfaculty.ucdavis.edu/bsjjones/MatchingJSS.pdf>.*
Thomas Kistler et al.; Continuous Program Optimization Design and Evaluation; 2001 IEEE; pp. 549-566; <http://ieeexplore.ieee.org/stamp/stamp.jsp?tp=&arnumber=931893>.*
Grigori Fursin; Collective Optimization; 2009 Springer; pp. 34-49; <http://link.springer.com/chapter/10.1007/978-3-540-92990-1_5#page-1>.*

(Continued)

*Primary Examiner* — Thuy Dao
*Assistant Examiner* — Cuong V Luu
(74) *Attorney, Agent, or Firm* — Leon R. Turkevich

(57) ABSTRACT

In one embodiment, a method comprises generating a first executable program optimized for an executable system based on compiling a program relative to an initial set of independent optimization metrics; determining first performance metrics based on the executable system executing the first executable program; adjusting the initial set of independent optimization metrics based on the first performance metrics to generate a second set of independent optimization metrics; and generating a second executable program, based on compiling the program relative to the second set of independent optimization metrics, for improved execution of the program in the executable system.

16 Claims, 5 Drawing Sheets

(56) References Cited

OTHER PUBLICATIONS

Norman F. Schneidewind; The State of SoFtware Maintenance; 1986 IEEE; pp. 303-310; <http://soclab.ee.ntu.edu.tw/~soclab/course/Milestones_in_SW_Evolution/3-6-IEEE-Tr-SE-Mar-1987-01702216.pdf>.*

Lobel et al., "Distributed Optimization over Random Networks", [online], Sep. 2008, [Retrieved on Apr. 27, 2011]. Retrieved from the Internet: <URL: http://web.mit.edu/asuman/www/presentations_web/Allerton08-talk.pdf>, pp. 1-18.

Bacon et al., "Compiler Transformations for High-Performance Computing", [online], Dec. 1994, [Retrieved on Apr. 27, 2011]. Retrieved form the Internet: <URL: http://www.research.ibm.com/people/d/dfb/papers/Bacon94Compiler.pdf>, pp. 345-420.

Colorni et al., "Distributed Optimization by Ant Colonies", [online], Mar. 4, 1994, [Retrieved on Apr. 27, 2011]. Retrieved from the Internet: <URL: ftp://iridia.ulp.ac.be/pub/mdorigo/conferences/IC.06-ECAL92.ps.gz>, pp. 1-12.

"Compiler Transformations", [online], [Retrieved on Apr. 27, 2011]. Retrieved from the Internet: <URL: http://www.sbcl.org/sbcl-internals/Compiler-Transformations.html>, 2 pages.

Rabbat et al., "Distributed Optimization in Sensor Networks", [online], [Retrieved on Apr. 27, 2011]. Retrieved from the Internet: <URL: http://www.ece.wisc.edu/~nowak/dosn.pdf>, pp. 1-12.

Burckhardt et al., "Verifying Compiler Transformations for Concurrent Programs", [online], Jan. 10, 2009, [Retrieved on Apr. 27, 2011]. Retrieved from the Internet: <URL: http://lambda-the-ultimate.org/node/3159>, pp. 1-2.

Mac Performance Guide, "Application support for multiple CPU cores", [online], Aug. 8, 2010, [Retrieved on Apr. 27, 2011]. Retrieved from the Internet: <URL: http://macperformanceguide.com/Optimizing-Grades.html>, pp. 1-3.

Moallemi et al., "Distributed Optimization in Adaptive Networks", [online], 2003, [Retrieved on Apr. 27, 2011]. Retrieved from the Internet: <URL: http://replay.web.archive.org/20090107085320/http://www.moallemi.com/ciamac/papers/nips-2003.pdf>, 8 pages.

Oracle Database PL/SQL Language Reference 11g Release 1 (11.1), "12 Tuning PL/SQL Applications for Performance", [online], 2009, [Retrieved on Apr. 27, 2011]. Retrieved from the Internet: <URL: http://download.oracle.com/docs/cd/B28359_01/appdev.111/b28370/tuning.htm>, 41 pages.

Raible Designs, "Optimizing a GWT Application with Multiple EntryPoints", [online], Mar. 25, 2009, [Retrieved on Apr. 27, 2011]. Retrieved from the Internet: <URL: http://raibledesigns.com/rd/entry/optimizing_a_gwt_application_with>, pp. 1-4.

Turner et al., U.S. Appl. No. 12/972,069, filed Dec. 17, 2010.

Moon et al., U.S. Appl. No. 13/085,686, filed Apr. 13, 2011.

* cited by examiner

AUTOMATED IMPROVEMENT OF EXECUTABLE APPLICATIONS BASED ON EVALUATING INDEPENDENT EXECUTION HEURISTICS

TECHNICAL FIELD

The present disclosure generally relates to the compiling and execution of executable applications or programs on different computing systems having prescribed hardware and/or software specific requirements. More particularly, the present disclosure relates to optimizing the compiling of executable applications or programs that are written for execution in a distributed computing environment.

BACKGROUND

This section describes approaches that could be employed, but does not necessarily describe approaches that previously have been conceived or employed. Hence, unless explicitly specified otherwise, any approaches described in this section are not prior art to the claims in this application, and any approaches described in this section are not admitted to be prior art by inclusion in this section.

Processor-based applications or programs to date have been written in accordance with hardware-specific and/or software-specific constraints of the underlying computing system intended to execute the applications or programs. Hence, attempts to optimize such applications or programs have been limited to setting the optimization to an unchangeable implementation for execution on a specific computing system. For example, a computer operating system (such as Microsoft Windows®) can be optimized during initial installation toward either one computing environment (e.g., executing a single application in the "foreground" to provide improved user experience), or a second distinct computing environment (e.g., executing multiple applications in the "background"): after the optimization of the operating system upon completion of the installation, there are no further changes permitted in optimizing the application. Additional examples of optimization includes optimizing a single application for a particular implementation (or a particular user), optimizing an application at a programming language level, optimizing a database for optimized execution by a specific computing system, or optimizing an application for network-based execution.

Each of the foregoing optimization techniques assumes that program optimization is based on selectively transforming a program operation into a semantically equivalent program operation based on one or more related costs, or "metrics", associated with the program operation and its semantic equivalent. In particular, existing optimization techniques attempt to improve execution efficiency by improving a prescribed "metric", or "cost", that quantifies a computing system resource that is required for execution of a program operation. For example, a compiler can locate identified nodes in an program graph representing a sequence of program operations, and selectively replace the identified nodes with semantically equivalent program operations (also represented as nodes) if the associated metrics indicate a lower cost will result. Such metrics can represent memory utilization, I/O bandwidth utilization, required processor execution cycles (e.g., operation counts), etc. The compiler can be supplied with default optimization metrics (e.g., use the minimal amount of memory; use the minimum number of processor execution cycles, maximize loop unrolling, minimize inlining, etc.) in order to improve efficiency with respect to an associated performance metric (e.g., minimal execution time, minimal bandwidth utilization, or minimal memory allocation, etc.).

The complexity associated with conventional program optimization increases dramatically if the optimization is attempted simultaneously with respect to two or more optimization metrics (e.g., increase loop unrolling while reducing inlining). Program optimization is further complicated if optimization metrics considered to be related to each other are applied simultaneously, especially since optimization metrics may conflict with each other. Hence, program optimization is extremely difficult to apply in complex executable systems offering multithreading, parallel computing, network-based distributed computing etc.

BRIEF DESCRIPTION OF THE DRAWINGS

Reference is made to the attached drawings, wherein elements having the same reference numeral designations represent like elements throughout and wherein.

DESCRIPTION OF EXAMPLE EMBODIMENTS

Overview

Figure 1:
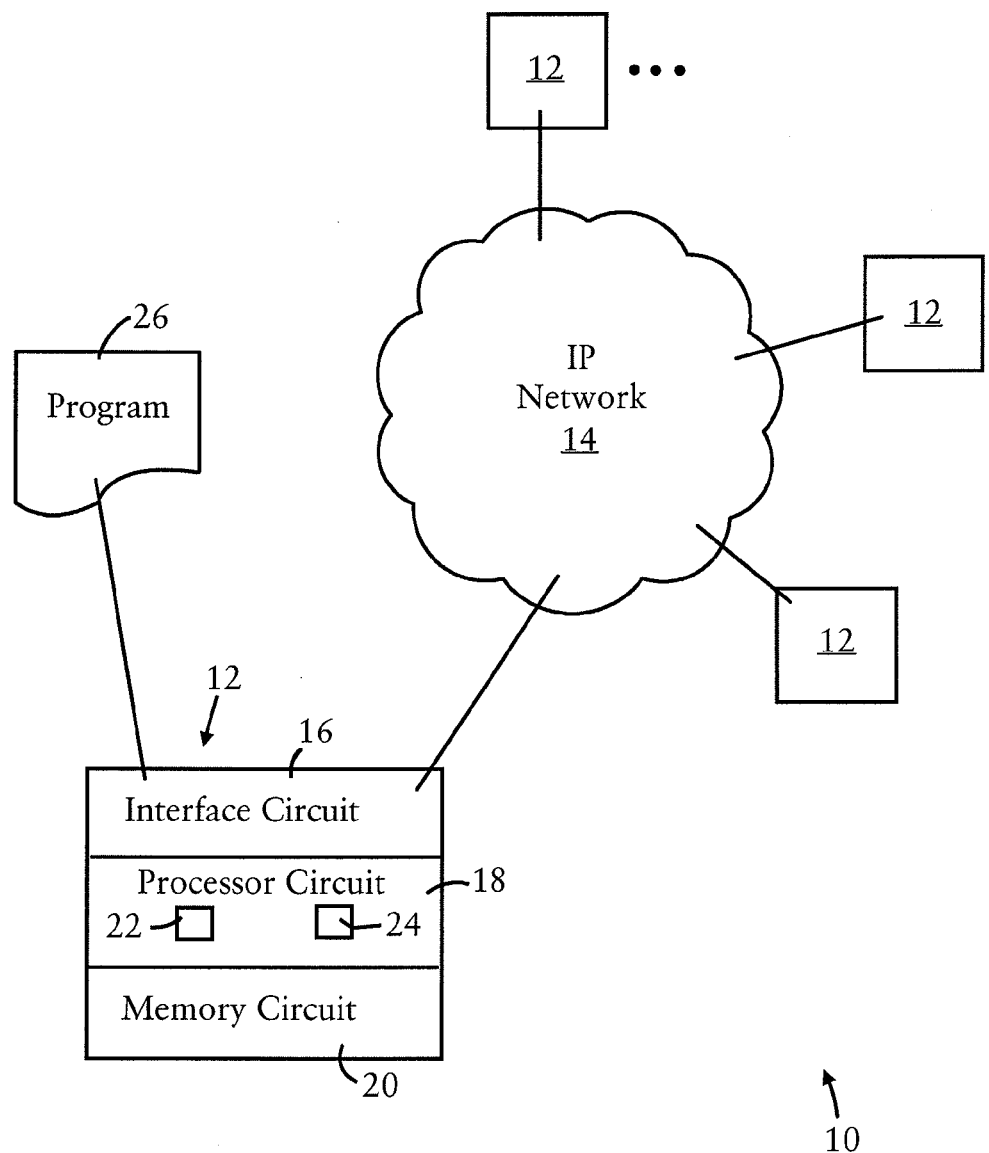
FIG. 1 illustrates an example system having an apparatus for executing a heuristic-based optimization of an executable application based on determined performance metrics, according to an example embodiment.

In one embodiment, a method comprises generating a first executable program optimized for an executable system based on compiling a program relative to an initial set of independent optimization metrics; determining first performance metrics based on the executable system executing the first executable program; adjusting the initial set of independent optimization metrics based on the first performance metrics to generate a second set of independent optimization metrics; and generating a second executable program, based on compiling the program relative to the second set of independent optimization metrics, for improved execution of the program in the executable system.

In another embodiment, an apparatus comprises a non-transitory tangible computer readable storage medium configured for storing an initial set of independent optimization metrics used for compiling a program; and a compiler circuit. The compiler circuit is configured for generating a first executable program optimized for an executable system based on compiling a program relative to the initial set of independent optimization metrics. The compiler circuit further is configured for: determining first performance metrics based on the executable system executing the first executable program, adjusting the initial set of independent optimization metrics based on the first performance metrics to generate a second set of independent optimization metrics, and generating a second executable program, based on compiling the program relative to the second set of independent optimization metrics, for improved execution of the program in the executable system.

Detailed Description

Particular embodiments enable executable programs (also referred to as "executable applications") to be optimized for any executable system using optimization metrics that are independent of each other. The particular embodiments provide optimization based on applying an initial set of independent optimization metrics to a compiler circuit: the initial set of independent optimization metrics can be completely arbitrary and/or random, such that each of the independent optimization metrics are independent and distinct from each other, and where no relationship needs to be established between any of the independent optimization metrics.

The compiler circuit generates a first executable program, as an optimization for an executable system, based on compiling a prescribed program relative to the initial set of independent optimization metrics. First performance metrics that are associated with execution of the first executable program by the executable system can then be determined in order to identify the relative efficiency of the first executable program as executed by executable system. The first performance metrics can be supplied to the compiler circuit, enabling the compiler circuit to adjust the initial set of independent optimization metrics, based on the first performance metrics, to generate a second set of independent optimization metrics as an improvement over the initial set of independent optimization metrics for optimization of the program for the executable system. The monitoring of performance metrics, adjusting of optimization metrics to generate a new set of optimization metrics, and compiling the program using the new optimization metrics can be repeated as an "optimization cycle".

Successive iterations of optimization cycles, namely determining performance metrics based on execution of respective executable programs (compiled according to their respective sets of independent optimization metrics) by the executable system, enables the compiler circuit to adjust the independent optimization metrics according to a heuristic-based probability distribution function that establishes a statistical model of the independent optimization metrics. Hence, the compiler circuit can monitor the performance metrics generated by the executable system during execution of the executable program, and automatically adjust the optimization metrics to provide improved optimization in compiling the prescribed program.

Moreover, the compiler circuit in an apparatus can receive remote performance metrics from a remote machine in a distributed computing system comprising at least the apparatus and a remote machine, and/or send the local performance metrics to the remote machine. Hence, the compiler circuit in the apparatus can provide localized optimization for the apparatus, while ensuring conflicts with the remote machine are avoided by sharing the performance metrics (and/or the optimization metrics), resulting in overall improved optimization in the distributed system. The compiler circuit also can automatically adjust, or "tune", the program in response to any changes or additions in either the program or the executable system without resetting or restarting the executable system. Hence, any changes in the program or executable system can be implemented "on the fly", with incremental optimizations being applied heuristically during successive iterations of the optimization cycles.

FIG. 1 is a diagram illustrating a system 10 having one or more machines 12 configured for providing computing services via a communications network 14, for example in an ad hoc computing environment, a distributed computing environment, or a cloud computing environment. The communications network 14 can be implemented, for example, as an Internet protocol (IP) based network, for example as a wired and/or wireless local area network, a wide area network such as the Internet, etc. Various communications protocols may be utilized within the communications network 14, for example Mobile Ad Hoc Networking (MANET), Mobile IPv6, etc., or a combination thereof. As described below, the network 14 also can be implemented as a heterogenous network comprising several distinct networks and/or network domains. Alternately, the system 10 can be implemented using a single machine 12, for example a standalone personal computer.

Each machine (i.e., apparatus) 12 can include an interface circuit 16, a processor circuit 18, and a memory circuit 20. The interface circuit 16 can include network interface circuitry (e.g., a wired or wireless Ethernet and/or Bluetooth interface) configured for sending and receiving data to and from other machines 12 via the IP network 14 or any other equivalent communications network. As described in further detail below with respect to FIGS. 2 and 3, the interface circuit 16 can be configured for receiving remote performance metrics from a remote machine 12 via the communications network 14, or sharing independent optimization metrics or performance metrics with one or more of the remote machines 12 for improved distributed execution within the system 10.

The processor circuit 18 can include a program execution circuit 22 configured for executing program operations, and a compiler circuit 24 configured for executing compiler and optimization operations, described below. The compiler circuit 24 can be configured for receiving a program 26 (e.g., source code written in a prescribed programming language, compiled executable code, etc.) via the interface circuit 16, and generating an executable program (e.g., executable code) that is optimized for an executable system such as the machine 12, a remote machine 12, and/or the distributed computing system 10. The program execution circuit 22 can be configured for executing the executable program generated by the compiler circuit 24. The memory circuit 20 can be configured for storing the program 26, parameters associated with optimizing the program 26 into an executable program, and parameters associated with execution of the executable program, described below.

Any of the disclosed circuits of the computing nodes 12 (including the interface circuit 16, the processor circuit 18, and the memory circuit 20) can be implemented in multiple forms. Example implementations of the disclosed circuits include hardware logic that is implemented in a logic array such as a programmable logic array (PLA), a field programmable gate array (FPGA), or by mask programming of integrated circuits such as an application-specific integrated circuit (ASIC). For example, the program execution circuit 22 can be implemented using one or more ASIC-based processor cores, and the compiler circuit 24 can be implemented as a separate processor core. Any of these circuits also can be implemented using a software-based executable resource that is executed by a corresponding internal processor circuit such as a microprocessor circuit (not shown) and implemented using one or more integrated circuits, where execution of executable code stored in a memory circuit 20 causes the integrated circuit(s) implementing the processor circuit to store application state variables in processor memory, creating an executable application resource (e.g., an application instance) that performs the operations of the circuit as described herein. For example, the compiler circuit 24 can be implemented as a software-based compiler executable program executed within the processor circuit 18. Hence, use of the term "circuit" in this specification can refer to a hardware-based circuit that includes logic for performing the described operations, and/or a software-based circuit that includes a processor circuit (implemented using one or more integrated circuits), the processor circuit including a reserved portion of processor memory for storage of application state data and application variables that are modified by execution of the executable code by a processor circuit. The memory circuit 20 can be implemented, for example, using one or more integrated circuits implemented in the form of a non-volatile memory such as a programmable read only memory (PROM) or an EPROM, and/or a volatile memory such as a DRAM, etc.

Further, any reference to "outputting a message" or "outputting a packet" (or the like) can be implemented based on creating the message/packet in the form of a data structure and storing that data structure in a non-transitory tangible memory medium in the disclosed apparatus (e.g., in a transmit buffer). Any reference to "outputting a message" or "outputting a packet" (or the like) also can include electrically transmitting (e.g., via wired electric current or wireless electric field, as appropriate) the message/packet stored in the tangible memory medium to another network node via a communications medium (e.g., a wired or wireless link, as appropriate) (optical transmission also can be used, as appropriate). Similarly, any reference to "receiving a message" or "receiving a packet" (or the like) can be implemented based on the disclosed apparatus detecting the electrical (or optical) transmission of the message/packet on the communications medium, and storing the detected transmission as a data structure in a non-transitory tangible memory medium in the disclosed apparatus (e.g., in a receive buffer). Also note that the memory circuit can be implemented dynamically by the processor circuit in the computing node 12, for example based on memory address assignment and partitioning executed by the internal processor circuit.

Further, the steps described herein (e.g., with respect to any of the FIGS. 1-5) can be implemented as executable code stored on a computer or machine readable non-transitory tangible storage medium (e.g., floppy disk, hard disk, ROM, EEPROM, nonvolatile RAM, CD-ROM, etc.) and that are completed based on execution of the code by a processor circuit implemented using one or more integrated circuits; the steps described herein also can be implemented as executable logic that is encoded in one or more non-transitory tangible media for execution (e.g., programmable logic arrays or devices, field programmable gate arrays, programmable array logic, application specific integrated circuits, etc.).

Figure 2:
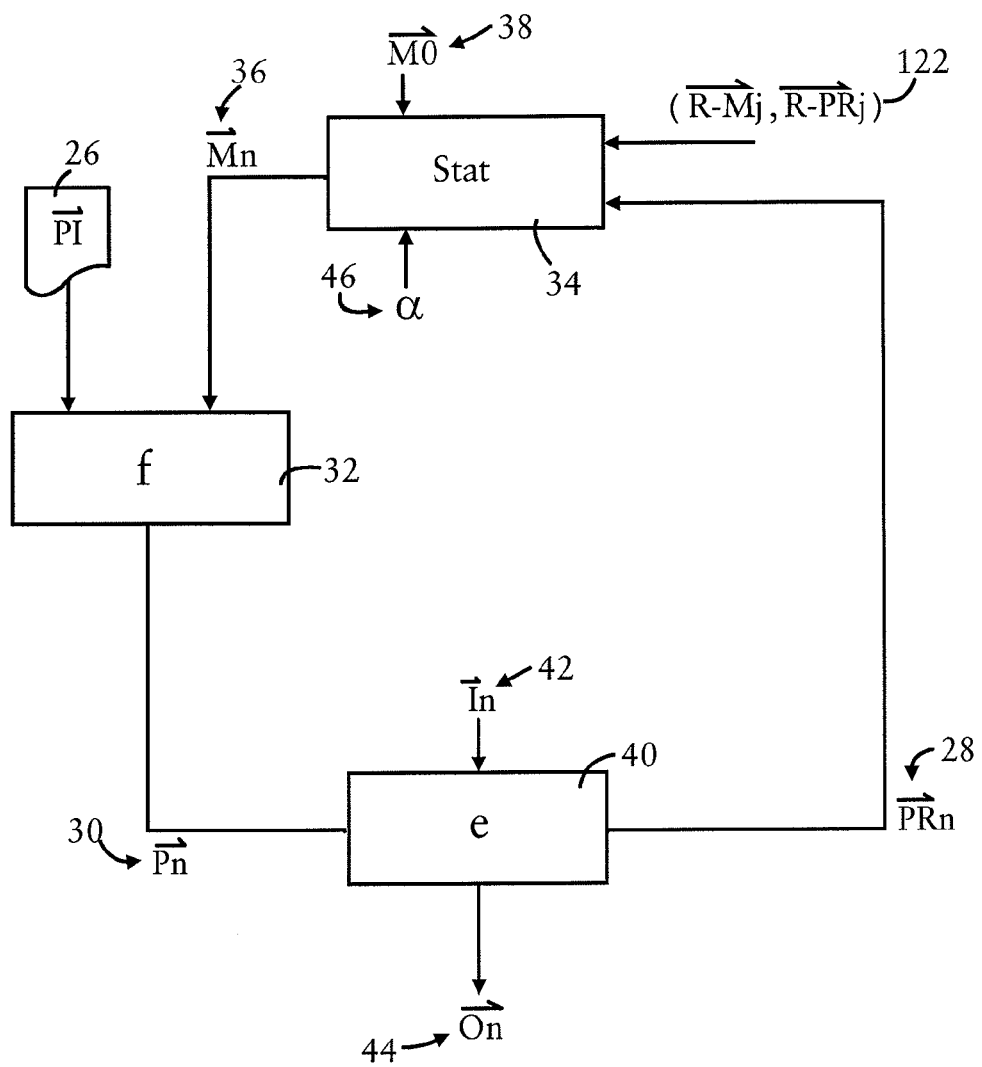
FIG. 2 illustrates the heuristic-based optimization of an executable application based on determined performance metrics, according to an example embodiment.
Figure 3:
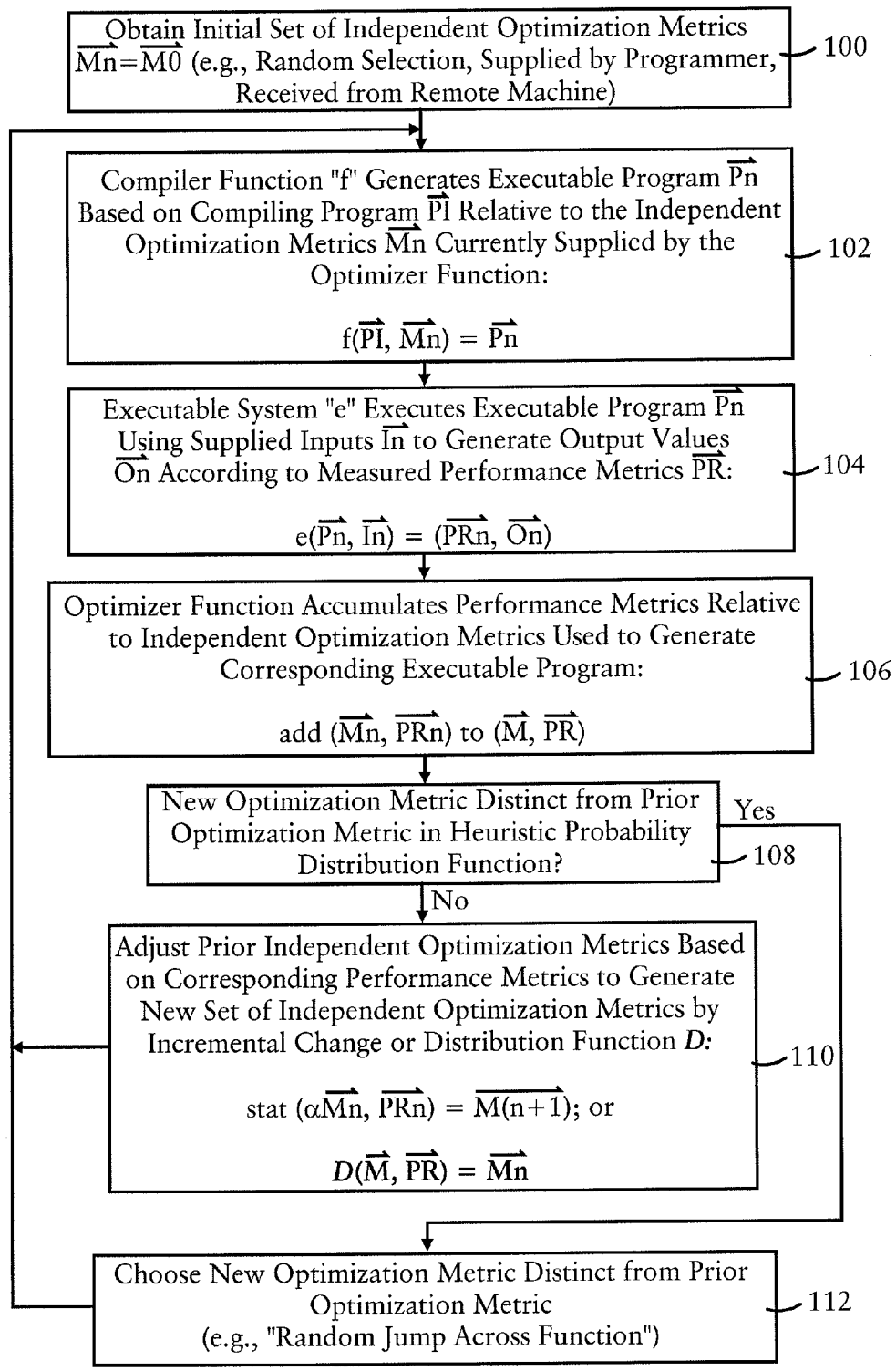
FIG. 3 illustrates an example method executed by the processor circuit of FIG. 1, according to an example embodiment.
Figure 4:
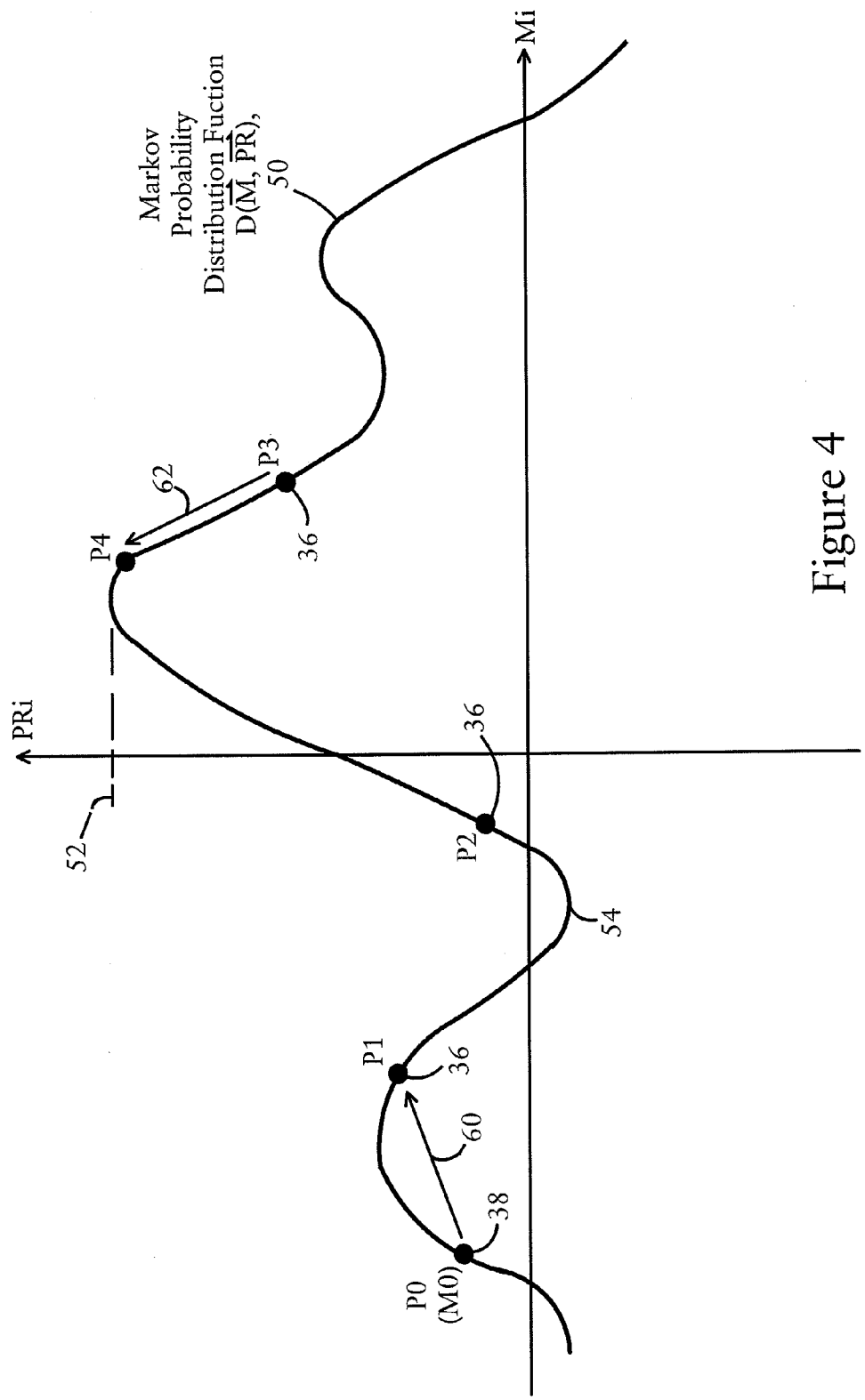
FIG. 4 illustrates a one-dimensional view of a Markov probability distribution function generated by the compiler circuit of FIG. 1 for heuristic-based optimization of an executable application based on determined performance metrics, according to an example embodiment.
Figure 5:
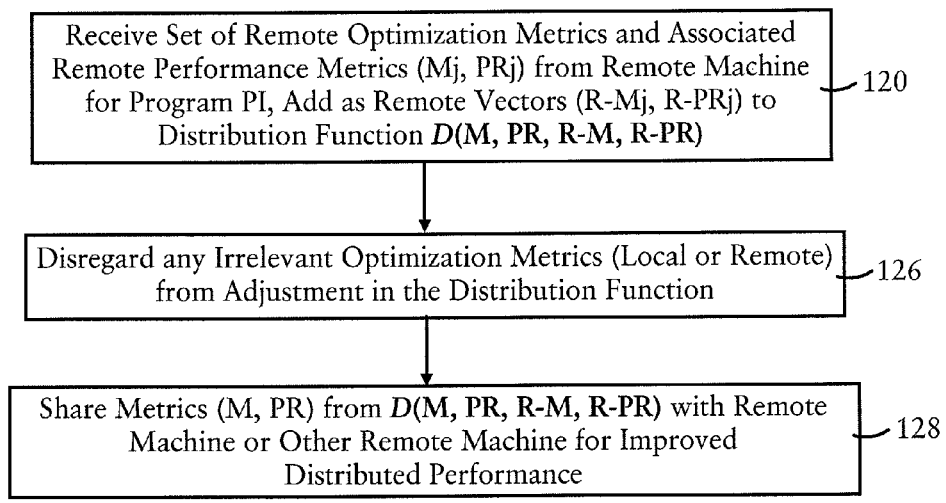
FIG. 5 illustrates example variations on adjusting the independent optimization metrics based on a probability distribution function, according to an example embodiment.

FIG. 2 illustrates in further detail the heuristic-based optimization by the compiler circuit 24 of an executable application program 26 based on determined performance metrics 28, according to an example embodiment. FIGS. 3-5 illustrate example acts by the processor circuit 18, according to an example embodiment. Each of the vector-based metrics and parameters 36, 38, 42, 44, 46, 122, as well as the input program 26 and each compiled program 30, can be stored in the memory circuit 20. Hence, all parameters described with respect to FIGS. 2-5 can be stored in the memory circuit 20.

The compiler circuit 24 can be configured for generating a first executable program 30 that is optimized for an executable system, for example a machine 12 executing the compiler circuit 24, the program execution circuit 22, and/or another remote machine 12. In particular, the compiler circuit 24 can include a compiler function "f" 32 and an optimizer function "stat" 34. The optimizer function 34 can be configured for supplying in step 100 of FIG. 3 a set of independent optimization metrics "Mn" 36 to the compiler function 32, starting for example with an initial set of independent optimization metrics "M0" 38, e.g., "Mn=M0, (n=0)" for the initial optimization cycle n=0. The initial set of independent optimization metrics "M0" 38 can be obtained, for example, by random selection, manual input by a programmer, or received from a remote machine 12 by the communications network 14. The optimizer function 34 can be configured for supplying a different set of independent optimization metrics 36 to the compiler function 32 for each optimization cycle (n=n+1), enabling the optimizer function 34 to determine and accumulate the performance metrics 28 to establish a statistical model of the independent optimization metrics 36, according to a probability distribution function "D" 50 based on the performance metrics 28.

The compiler function 32 can be configured for compiling in step 102 the input program "PI" 26 relative to the initial set of independent optimization metrics "Mn" (n=0) 38 to generate the first executable program "Pn" (n=0) 30. Each of the parameters illustrated in FIG. 2, including the input program 26, the supplied optimization metrics "M0" 38 or "Mn" 36, and the executable program "Pn" 30 can be expressed as a multidimensional vector (indicated by the arrow symbol and/or boldface type).

Example metrics within the multidimensional set of independent optimization metrics 36 can include inlining heuristics (e.g., determining when to eliminate a function call between a first function and a second function by inlining the second function into the first function), loop unrolling heuristics (e.g., determining whether to repeat an operation prior to performing a jump), remote procedure call heuristics (e.g., determining whether a procedure should be performed in a local computing system or a remote computing system 12 reachable via a network 14); message size heuristics (e.g., determining the average preferred size of a data packet transmitted via a communications network 14), and/or message number heuristics (e.g., determining the average number of messages or data packets that should be transmitted or received per unit time via the communications network 14), memory utilization heuristics, I/O bandwidth utilization heuristics, processor performance heuristics, power consumption heuristics, number of round-trip transmissions, network latency, network bandwidth, jitter, resource utilization, load balancing, caching requirements, administration or Federation boundaries, security of transport, or data type heuristics (e.g., media streams) etc.

The compiler function 32 can attempt to optimize the program 26 based on building a syntax tree representing the program execution states, where each node of the tree can be annotated with metrics that describe whether alternative (semantically-equivalent) expressions should be used in place of an existing expression in the syntax tree. Hence, the compiler function 32 can employ pattern matching to identify portions of the syntax tree having matching patterns that can have semantic equivalents as candidates for optimizing the syntax tree, based on the annotations associated with the matching patterns. Hence, changing a program 26 based on one of the metrics (increasing inlining) can cause a corresponding change in the program (e.g., increasing the file size of the executable program 30) that may adversely affect another aspect of execution performance, even though the compiled program is semantically equivalent to the original program 26.

According to an example embodiment, the necessity for determining any relationships between the metrics is eliminated based on providing a heuristic-based optimization within the optimizer function 34, where the optimizer function 34 can accumulate sets of performance metrics 28 in step 106 from execution of respective executable programs 30 in step 104 over multiple optimization cycles. In particular, the first executable program ("Pn, n=0") 30 is generated in step 102 by the compiler function 32 compiling the program 26 relative to the initial set of independent optimization metrics ("Mn=M0, n=0") 38, which can be expressed according to the vector-based equation "f(PI, M0)=Pn (n=0)". The first executable program ("Pn, n=0") 30 is supplied in step 104 to an executable system 40 intended as the optimization target for the first executable program 30, illustrated as "e" in FIG. 2. For example, the first executable program 30 can be supplied to the program execution circuit 22, or a remote machine 12 via the communications network 14.

The first executable program 30 is executed in step 104 by the executable system 40 (e.g., the program execution circuit 22, or a remote machine 12) using a vector of supplied program inputs "I" 42, for example according to the vector equation "e(Pn, In)=(PRn, On)", resulting in the vector of program outputs "On" 44 and the performance metrics "PRn" 28. The performance metrics "PRn" 28 are the result of the execution of the first executable program "Pn (n=0)" 30 by the executable system "e" 40 using the program inputs "I" 42, and can include any number of measured parameters associated with execution of the executable program 30, for example number of processor instruction cycles to complete program execution (or total execution time), the amount of memory utilized, number of jump instructions, average size of transmitted packet, average number of transmitted packets per unit time, first rate of data traffic, bandwidth utilization, number of remote procedure calls, etc.

Hence, the first performance metrics ("PRn, n=0") 28 for the initial optimization cycle (n=0) can be supplied to the optimization function 34, enabling the optimization function 34 within the compiler circuit 24 to accumulate in step 106 the first performance metrics ("PRn, n=0") 28 relative to the initial set of independent optimization metrics "M0" 38 in order to establish a statistical model of the independent optimization metrics 36 relative to the first performance metrics ("PRn, n=0") 28 according to a heuristic-based probability distribution function "D".

The optimization function 34 can adjust in step 110 the initial set of independent optimization metrics 38 based on the first performance metrics ("PRn, n=0") (e.g., according to the statistical model "stat" established by the probability distribution function "D") to generate a second set of independent optimization metrics, for example according to the example expression "stat(αMn, PRn)=M (n+1)", where a prescribed damping function "α" 46 can be applied to the prior independent optimization metrics "Mn" in order to limit a change in any one of the independent optimization metrics (e.g., in order to prevent introducing any instability into the executable system 40).

The optimizer function 34 outputs in step 110 the adjusted independent optimization metrics "M(n+1)" as the second set of independent optimization metrics that can be utilized by the compiler function 32 for the next optimization cycle in step 102. Hence, the optimizer function 34 can accumulate sets of performance metrics 28 in step 106 that are determined from execution of respective executable programs 30 (Mn, PRn) generated over multiple optimization cycles: the executable programs 30 can be generated over multiple optimization cycles based on the compiler function 32 compiling the input program 26 relative to respective sets of the independent optimization metrics 36 over multiple optimization cycles (n=0, 1, 2, 3, . . . ).

Hence, the accumulation of performance metrics 28 relative to the associated independent optimization metrics 36 enables the heuristic-based distribution function "D (M, PR)" executed by the optimizer function 34 to output a newer optimization metric "M" 36 that provides an improved optimization over prior optimization cycles.

FIG. 4 illustrates a one-dimensional view of a heuristic-based Markov probability distribution function "D (M, PR)" 50 generated by the optimizer function 34 of the compiler circuit 24, according to an example embodiment. Each metric in the multidimensional optimization metric "Mn" 36 and the multidimensional performance result "PRn" 28 is treated as a node in a Markov sequence (or Markov chain), where a transition probability exists between each of the nodes in order to identify the probability that moving from one optimization metric node to another optimization metric node will provide a corresponding change from one performance result to another performance result. Although illustrated in only one dimension in FIG. 4 ("X" axis represents a single dimension "Mi" of an optimization metric and the "Y" axis represents a single dimension "PRi" of a performance result metric), the optimizer function 34 performs the optimization step 110 across the entire vector space to identify a new multidimensional optimization metric 36 along the distribution function 50 in an attempt to reach a state of optimized performance 52 for the intended executable system 40.

As illustrated in FIG. 4, the initial optimization metric "M0" 38 and each potential optimization metric "Mn" 36 is illustrated as a point (e.g., P0, P1, P2, P3, P4) along the distribution function 50. The path 60 illustrates the sequence of optimization metrics generated successively by the optimizer function 34 during successive iterations of the optimization cycles, according to the probability distribution function 50, starting with the initial optimization metric "M0" and ending with the optimization metric 36 illustrated by point "P1". If the optimizer function 34 determines in step 108 of FIG. 3 that adjusting the optimization metric 36 along the distribution function 50 would result in worse overall performance (e.g., from point P1 to point P2 due to a local minimum 54 in the distribution function), the optimizer function 34 can apply in step 112 a new random selection for the optimization metric "Mn" 36, effectively executing a random "jump" from the point P1 to the point P3 of FIG. 4 in order to bypass the local minimum 54 in the distribution function 50. Hence, jumping from the optimization metric "P1" 36 to the optimization metric "P3" enables the optimizer function 34 to change its position along the distribution function 50 in order to attempt to reach an optimum performance result 52 via the path 62 (illustrated by the point "P4").

FIG. 5 illustrates example variations that can be applied to the adjusting of the optimization metrics 36 by the optimizer function 34 in step 110 of FIG. 4. The optimizer function 34 of the compiler circuit 24 can be configured for receiving in step 120 a set of remote optimization metrics "R-M" and associated remote performance metrics "R-PR" 122 from a remote machine 12 via the communications network 14. The remote optimization metrics "R-Mj" can identify the relevant optimization metrics used by a remote compiler to optimize the program 26 for execution in the remote machine 12, and the associated remote performance metrics "R-PRj" can identify the resulting performance encountered by the execution of the remote machine 12.

Hence, the optimizer function 34 can apply the remote optimization metrics and remote performance metrics 122 to its local probability distribution function 50 in order to establish an expanded probability distribution function "D(M, PR, R-M, R-PR)" that can track optimization metrics and performance metrics across multiple machines. Consequently, the optimizer function 34 can choose to adjust in steps 120 and 110 the optimization metrics 36 according to the expanded probability distribution function based on the remote performance metrics, for improved execution of the subsequently compiled program 30 within a distributed computing system 10, even at the expense of some loss of performance in the local machine 12. In addition, the optimizer function 34 can identify in step 126 any portion of the local or remote optimization metrics (or performance metrics) as irrelevant, and can disregard the irrelevant portion in the generation of the next set of independent optimization metrics 36 according to the probability distribution function 50.

As illustrated in FIG. 5, the optimizer function 34 also can share in step 128 any of the metrics 28, 30, or 122 from the expanded probability distribution function "D(M, PR, R-M, R-PR)" with either the remote machine 12 having sent the remote metrics 122, or with any other remote machine 12 and communication with the optimizer function 34 via the communications network 14. Hence, the example embodiment enables distributed optimization techniques, where compiler circuit 24 in the respective machines 12 of the distributed system 10 can interact to provide localized optimizations of the program 26 while ensuring overall optimization within the distributed system 10.

One example of distributed optimization can include reliability on a per-machine (12) basis and on an overall distributed system (10) basis. Reliability can be achieved by redundancy of execution; hence, an optimization metric and a performance metric can be utilized for ensuring optimized reliability based on redundancy of execution. In one example, reliability of each machine 12 can be measured as a performance metric, enabling the use of an optimization metric for selecting remote machines 12 for remote execution.

Another example of distributed optimization can include optimization of the distributed system 10 based on the distributed system comprising heterogenous networks. For example, the network 14 of FIG. 1 can be a heterogenous network comprising multiple networks across multiple network domains, where each network and/or network domain can have its own associated optimization metrics and performance metrics (e.g., latency, bandwidth, etc). Hence, one optimization metric for a given network (or network type or network domain) can enable optimization based on determining how portions of executable code should be distributed for execution througout the distributed system 10. Other example optimization metrics can include determining whether to trade off latency for bandwidth among the multiple networks or multiple network domains, determining what remote machines 12 should participate in distributed exectuion, how distributed data should be stored among the remote machines 12, how traffic should be routed throughout the system 10, etc.

According to example embodiments, optimization metrics can be automatically adjusted based on heuristic analysis of prior optimization metrics relative to performance results in an executable system having implemented the optimization metrics. Hence, program efficiency can be implemented in an efficient manner for a specific implementation, without the necessity of identifying relationships between interrelated optimization metrics or performance metrics.

While the example embodiments in the present disclosure have been described in connection with what is presently considered to be the best mode for carrying out the subject matter specified in the appended claims, it is to be understood that the example embodiments are only illustrative, and are not to restrict the subject matter specified in the appended claims.

What is claimed is:

1. A method executed by a processor, the method comprising:
generating a first executable program optimized for an executable system based on compiling a program relative to an initial set of independent optimization metrics;
determining first performance metrics based on the executable system executing the first executable program;
adjusting the initial set of independent optimization metrics based on the first performance metrics to generate a second set of independent optimization metrics;
generating a second executable program, based on compiling the program relative to the second set of independent optimization metrics, for improved execution of the program in the executable system;
wherein the executable system is a distributed computing system that comprises a first machine and a remote machine, the first performance metrics based on the first executable program executed by the first machine in the executable system, the method further comprising:
receiving a first set of remote performance metrics, the first set of remote performance metrics associated with execution by the remote machine of the program compiled according to a first remote set of independent optimization metrics;
the adjusting including generating the second set of independent optimization metrics based on applying a probability distribution function based on the first set of remote performance metrics, for improved execution of the second executable program by the first machine in the distributed computing system; and
the first machine and the second machine sharing at least a portion of one of their respective independent optimization metrics or their performance metrics, for improved distributed execution of the program in the first machine and the remote machine.

2. The method of claim 1, wherein the adjusting includes adjusting the independent optimization metrics according to the probability distribution function that establishes a statistical model of the independent optimization metrics based on the first performance metrics.

3. The method of claim 2, wherein the adjusting includes accumulating sets of the performance metrics from execution of respective executable programs generated based on compiling the program relative to respective sets of the independent optimization metrics.

4. The method of claim 2, wherein the adjusting includes limiting a change in any one of the independent optimization metrics according to a prescribed damping function.

5. The method of 2, wherein the adjusting includes establishing the probability distribution function based on a Markov sequence generated of the independent optimization metrics.

6. The method of claim 2, wherein the initial set of independent optimization metrics is established based on a random selection of the independent optimization metrics, the method further comprising generating successive iterations of the sets of independent optimization metrics based on the statistical model, or applying a second random selection of the independent optimization metrics to bypass a local minimum in the statistical model.

7. The method of claim 1, wherein each of the independent optimization metrics are independent and distinct from each other, and wherein no relationship is established between any of the independent optimization metrics for the adjusting of the initial set of independent optimization metrics.

8. The method of claim 1, wherein the adjusting includes identifying a portion of the initial set of independent optimization metrics as irrelevant to execution by the executable system, and disregarding the portion in the generation of the second set of independent optimization metrics.

9. An apparatus comprising:
a non-transitory tangible computer readable storage medium configured for storing an initial set of independent optimization metrics used for compiling a program; and
a compiler circuit configured for generating a first executable program optimized for an executable system based on compiling the program relative to the initial set of independent optimization metrics, the compiler circuit further configured for:
determining first performance metrics based on the executable system executing the first executable program,
adjusting the initial set of independent optimization metrics based on the first performance metrics to generate a second set of independent optimization metrics, and
generating a second executable program, based on compiling the program relative to the second set of independent optimization metrics, for improved execution of the program in the executable system;
wherein the executable system is a distributed computing system that comprises the apparatus and a remote machine, the first performance metrics based on the first executable program executed by the apparatus, the apparatus further comprising:
an interface circuit configured for receiving a first set of remote performance metrics from the remote machine distinct from the apparatus, the first set of remote performance metrics associated with execution by the remote machine of the program compiled according to a first remote set of independent optimization metrics;
the compiler circuit configured for generating the second set of independent optimization metrics based on applying a probability distribution function based on the first set of remote performance metrics, for improved execution of the second executable program by the apparatus in the distributed computing system;
the compiler circuit configured for sharing, with the second machine, at least a portion of one of the independent optimization metrics or the performance metrics, for improved distributed execution of the program in the apparatus and the remote machine.

10. The apparatus of claim 9, wherein the compiler circuit is configured for adjusting the independent optimization metrics according to the probability distribution function that establishes a statistical model of the independent optimization metrics based on the first performance metrics.

11. The apparatus of claim 10, wherein the compiler circuit is configured for accumulating sets of the performance metrics from execution of respective executable programs generated based on the compiler circuit compiling the program relative to respective sets of the independent optimization metrics.

12. The apparatus of claim 10, wherein the compiler circuit is configured for limiting a change in any one of the independent optimization metrics according to a prescribed damping function.

13. The apparatus of claim 10, wherein the compiler circuit is configured for establishing the probability distribution function based on a Markov sequence generated of the independent optimization metrics.

14. The apparatus of claim 10, wherein the initial set of independent optimization metrics is established based on a random selection of the independent optimization metrics, the compiler circuit configured for generating successive iterations of the sets of independent optimization metrics based on the statistical model, or applying a second random selection of the independent optimization metrics to bypass a local minimum in the statistical model.

15. The method of claim 9, wherein the adjusting includes identifying a portion of the initial set of independent optimization metrics as irrelevant to execution by the executable system, and disregarding the portion in the generation of the second set of independent optimization metrics.

16. Logic encoded in one or more non-transitory tangible machine readable media for execution and when executed operable for:
generating a first executable program optimized for an executable system based on compiling a program relative to an initial set of independent optimization metrics;
determining first performance metrics based on the executable system executing the first executable program;
adjusting the initial set of independent optimization metrics based on the first performance metrics to generate a second set of independent optimization metrics;
generating a second executable program, based on compiling the program relative to the second set of independent optimization metrics, for improved execution of the program in the executable system;
wherein the executable system is a distributed computing system that comprises a first machine and a remote machine, the first performance metrics based on the first executable program executed by the first machine in the executable system, the logic when executed further operable for:
receiving a first set of remote performance metrics, the first set of remote performance metrics associated with execution by the remote machine of the program compiled according to a first remote set of independent optimization metrics;
the adjusting including generating the second set of independent optimization metrics based on applying a probability distribution function based on the first set of remote performance metrics, for improved execution of the second executable program by the first machine in the distributed computing system; and
wherein the first machine and the second machine share at least a portion of one of their respective independent optimization metrics or their performance metrics, for improved distributed execution of the program in the first machine and the remote machine.

* * * * *